United States Patent [19]

Carstensen

[11] Patent Number: 4,619,568
[45] Date of Patent: Oct. 28, 1986

[54] HEAT RECOVERABLE LOCKING DEVICE

[76] Inventor: Kenneth J. Carstensen, 4540 N. 44th St., No. 70, Phoenix, Ariz. 85018

[21] Appl. No.: 544,868

[22] Filed: Oct. 24, 1983

[51] Int. Cl.⁴ .............................................. F16B 39/12
[52] U.S. Cl. ................................. 411/222; 411/242; 411/246; 411/260; 411/909
[58] Field of Search .............. 411/222, 237, 238, 427, 411/241, 242, 190, 246, 254, 257, 259, 260, 261, 263, 276, 909

[56] References Cited

U.S. PATENT DOCUMENTS

| | | | |
|---|---|---|---|
| 83,213 | 10/1868 | Sanders | 411/427 X |
| 818,584 | 4/1906 | Treatt | 411/222 |
| 1,346,730 | 7/1920 | Viebrock | 411/237 |
| 1,720,799 | 7/1929 | McLaughlin | 411/260 |
| 2,429,103 | 10/1947 | Mitchell | 411/260 X |
| 3,174,851 | 3/1965 | Buehler | 148/426 |
| 3,740,839 | 6/1973 | Otte | 411/909 X |
| 4,378,187 | 3/1983 | Fullerton | 411/267 |

FOREIGN PATENT DOCUMENTS

| | | | |
|---|---|---|---|
| 180026 | of 1926 | Australia | 411/261 |
| 804389 | 11/1958 | United Kingdom | 411/222 |

*Primary Examiner*—Gary L. Smith
*Assistant Examiner*—Adrian H. Whitcomb, Jr.
*Attorney, Agent, or Firm*—Bogucki, Scherlacher, Mok & Roth

[57] ABSTRACT

A retaining member (26) is constructed undersized from a memory metal for permitting a member (26) disposed in an element retaining position to recover and grippingly engage a stud (12) on which the member (26) is arranged. The retaining member (26) can be used alone, or in combination with a load-carrying nut (16) for greater strength. Providing a convex face (46) on the retaining member (26), and a concave surface (40) on the load-carrying nut (16), permits the total height of the arrangement to be limited to only slightly more than the height of the load-carrying nut alone in order to meet existing space limitations.

1 Claim, 5 Drawing Figures

HEAT RECOVERABLE LOCKING DEVICE

BACKGROUND OF THE INVENTION

1. Field of the Invention

This invention relates generally to threaded fasteners and the like, and more particularly to friction gripping fastener apparatus which resists releasing when subjected to vibration.

2. Description of the Prior Art

Moving machinery inherently creates vibrations which tend to loosen fasteners, particularly screw threaded fasteners, employed to hold together various parts of the machinery. Accordingly, various kinds of locking fasteners are used to prevent loosening of the fasteners in service. Typical of these locking fasteners are those employing a wedge principle, examples of which can be found in U.S. Pat. Nos. 646,898, issued Apr. 3, 1900, to H. A. Deiters; 788,324, issued Apr. 25, 1905, to W. L. Morrow; U.S. Pat. No. 1,290,357, issued Jan. 7, 1919, to G. W. Rissler; U.S. Pat. No. 2,886,085, issued May 12, 1959, to A. W. Morton; and U.S. Pat. No. 4,378,187, issued Mar. 29, 1983, to R. L. Fullerton. Most of these known locking arrangements have the disadvantage of requiring a nut assembly which is substantially double the height of a single nut. This problem is of particular concern when dealing with certain kinds of motor vehicles, such as racing cars, and with aircraft, particularly helicopters, where vibration and load problems are particularly severe, yet there is little space available to accommodate fasteners. The aforementioned U.S. Pat. No. 4,378,187 overcomes this problem by providing a nut assembly in which a jam nut portion is arrangeable within a cavity provided in a nut casing. This known assembly, however, is rather complex inasmuch as it has several parts and numerous sloping surfaces which must be made to rather close tolerances.

Another class of locking fasteners which is well known and widely used employs a deformable element to achieve locking. Examples of such locking arrangements can be found in U.S. Pat. Nos. 1,720,799, issued July 16, 1929, to M. P. McLaughlin, and U.S. Pat. No. 2,429,103, issued Oct. 14, 1947, to R. Mitchell.

There is known a class of metals referred to as "memory metals" because they have the ability of recovering to a non-deformed configuration after having been temporarily deformed. An important group of such materials are nickel-base alloys essentially comprising nickel and titanium. These metals possess a thermoelastic transition between a martensitic state and an austenitic state, wherein the metal can be deformed dimensionally while in the martensitic state and recover to its non-deformed dimension or configuration in the austenitic state. The material normally is in the austenitic state at normal or ambient temperatures, and is transformed into the martensitic state by cooling the metal below a temperature inherent to the material.

Examples of nickel-titanium based memory metals can be found in U.S. Pat. Nos. 3,174,851, issued Mar. 23, 1965 to W. J. Buehler et al, and U.S. Pat. No 3,351,463, issued Nov. 7, 1967 to A. G. Rozner et al; while a method for growing single crystals of such metals can be found in U.S. Pat. No. 3,352,722, issued Nov. 14, 1967 to F. E. Wang et al.

Various examples of uses of memory metals as described above can be found in U.S. Pat. Nos. 3,285,470, issued Nov. 15, 1966 to E. H. Frei et al; U.S. Pat. No. 3,391,882, issued July 9, 1968 to J. F. Johnson et al; U.S. Pat. No. 3,403,238, issued Sept. 24, 1968, to W. J. Buehler et al; U.S. Pat. No. 3,416,342, issued Dec. 17, 1968, to D. Goldstein et al; U.S. Pat. No. 4,379,575, issued Apr. 12, 1983, to C. L. Martin; and U.S. Pat. No. 4,930,599, issued June 28, 1983, to H. C. Broyles.

Additional examples of applications of memory metals as described above can be found in the two U.S. patents issued to R. F. Otte et al, U.S. Pat. Nos. 3,740,839 and U.S. Pat. No. 3,861,030, issued June 26, 1973, and Jan. 21, 1975, respectively, and in U.S. Pat. No. 4,022,519, issued May 10, 1977 to F. W. L. Hill.

Also of interest with regard to memory materials, their composition and applications, is British Pat. No. 1,116,158, published June 6, 1968.

SUMMARY OF THE INVENTION

It is an object of the present invention to provide fastener apparatus capable of being easily installed and removed, but which retains itself in place while positioned.

It is another object of the present invention to provide a fastener locking apparatus which can be used either alone or in combination with a conventional nut and the like.

A still further object of the present invention is to provide a fastener locking apparatus which deforms during installation, yet can be removed and reused repeatedly.

Yet another object of the present invention is to provide a fastener locking apparatus in which the total height is not substantially greater than that of a conventional nut.

These and other objects are achieved in accordance with the present invention by providing fastener apparatus comprising a body member constructed from a memory metal and provided with a bore undersized relative to a stud on which the body member is to be engaged while below its transition temperature for grippingly engaging the associated stud when the body member has recovered to normal operating temperature. Advantageously, the bore is a through bore, and the body member has internal screw threads extending into the bore provided in the body member, with the internal threads being arranged for threadingly engaging with threads provided on an associated stud. The memory metal preferably is one which possesses a thermoelastic transition between a martensitic state and an austenitic state. In this manner, the metal is deformed dimensionally while in its martensitic state and recovers to a non-deformed dimension in the austenitic state thus tending to reduce the diameter of the bore when the body member has recovered to normal operating temperature. This permits the apparatus to be threaded on or threaded off an associated stud simply by cooling the apparatus, and causes the device to grippingly engage an associated stud, and the like, when the apparatus is at a normal, or ambient, temperature. Advantageously, the device is sized relative to the stud on which it is to be mounted so as to be stressed well below its yield limits.

According to a preferred embodiment of the present invention, the body member is a solid body having a periphery and a pair of oppositely directed faces, one of the faces having a convex shape. More specifically, the solid body is in the shape of a frusto-conical disc provided in a peripheral area thereof with at least one pair of opposed recesses forming a slotted spanner head arranged for receiving a conventional spanner wrench.

A lock nut having a convex face particularly is advantageous when used with a conventional load-carrying nut to increase load capabilities of the fastener arrangement. By providing a concave face directed outwardly on the load-carrying nut, the total height of the load-carrying nut and locking nut combination can be retained to substantially that of a load-carrying nut alone, while providing a very effective locking action.

In use, the locking nut is first cooled in a suitable, known matter, as by the use of a suitable refrigerant, which may be liquid nitrogen, and the like. Once cooled, the locking nut can be screwed onto the associated stud, and the like, in a process known as "working" the memory metal from which the nut is fabricated. This working of the memory metal permits the nut to be threaded onto the larger threads of the associated stud. After it is in place on the associated stud, either independently or in combination with a load-carrying nut, the nut is permitted to warm to normal, or ambient, temperature, which causes the memory metal to recover and grippingly engage the associated stud. If it is decided to subsequently remove the locking nut, such can be accomplished in a simpler manner after recooling the memory material.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
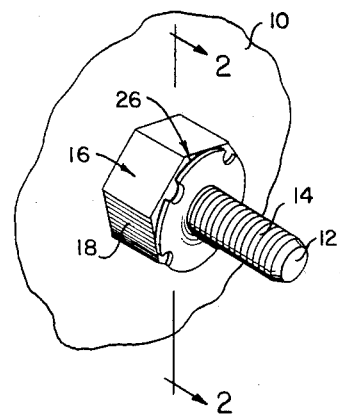
FIG. 1 is a fragmentary, perspective view, showing fastener apparatus according to the present invention.
Figure 2:
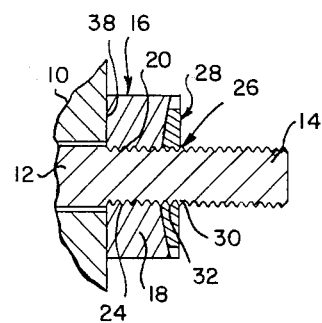
FIG. 2 is an enlarged, fragmentary, sectional view taken generally along the line 2—2 of FIG. 1.
Figure 3:
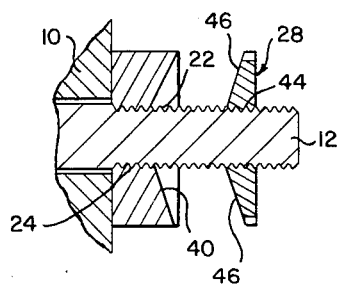
FIG. 3 is a fragmentary, sectional view, similar to FIG. 2, but showing a part in a moved position.

Referring now more particularly to FIGS. 1-4 of the drawings, an element 10, which may be a part of an engine block, a vehicle or aircraft frame, and the like, is shown as having arranged extending through a hole formed therein a stud 12 provided with conventional screw threads 14 for permitting retention of element 10 on another suitable part (not shown). As illustrated, element 10 is held in place as by a load-carrying nut 16 including a block 18 provided with an internal wall 20 of generally cylindrical configuration and defining a hole through block 18. Wall 20 has internal screw threads 24 formed on it, which threads 24 threadingly engage with threads 14 of stud 12 in the conventional manner in order to permit nut 16 to be torqued-down against element 10. Also arranged on stud 12 is a memory metal lock nut 26 comprising a body member 28 constructed in a conventional manner having adequate strength and provided with a through bore 30 incorporating laterally conventional screw threads 32. Threads 32 are arranged for threadingly engaging with threads 14 provided on the associated stud 12, but bore 30 is undersized relative to hole 22 defined by wall 20 of block 18, and accordingly undersized relative to a diameter of stud 12 forming threads 14. The undersize relationship establishes that when the body member 28 returns to temperature it will grippingly engage the associated stud 12 on which nut 16 and lock nut 26 are threadably disposed.

The memory metal forming body member 28 is selected from a suitable, known metal possessing a thermoelastic transition between a state in which the material is deformable dimensionally and a state in which it is capable of recovering to a non-deformed dimension for reducing the diameter of the bore 30 when the body member has recovered. Preferably, the memory metal selected for body member 28 can be a metal as set forth in U.S. Pat. No. 3,174,851, issued Mar. 23, 1965, to W. J. Buehler et al, and the disclosure of which prior U.S. patent hereby is incorporated herein. Essentially, these memory metals are alloys of nickel and titanium, and have a transition temperature between the aforementioned desired states. Another example of such a material can be found in U.S. Pat. No. 3,740,839, issued June 26, 1973, to R. F. Otte et al, the pertinent portions of which disclosure hereby are incorporated herein as well.

The transition temperature is a function of whatever memory metal is employed, as each alloy has a transition temperature which is characteristic of that metal. Attention is directed to the aforementioned U.S. Pat. Nos. 3,174,851 and 3,740,839 which give typical temperatures of $-75°$ C. and $-40°$ C., respectively. As pointed out in U.S. Pat. No. 3,740,839, however, selection of transition temperatures is dependent on an intended end use, and should be selected, by known techniques of manufacture, so that the lock nut 26 is used at a normal operating temperature which is in the austenitic state of the metal, and yet can be cooled to a temperature in the martensitic state.

The aforementioned metals commonly are austenitic, or deformation resisting, at room or ambient temperatures. Cooling of the material to a point below the transition temperature in order to permit working conventionally is achieved by use of suitable, known coolants, such as conventional refrigerators, including the fluorinated hydrocarbons, and the conventional cryogenic materials, such as liquid nitrogen.

In this manner, it will be appreciated that as lock nut 26 is threaded onto an associated stud 12 after having been first cooled below its transition point for a martensitic, or deformable, state, body member 28 will be "worked" onto stud 12 so as to be deformed from the normal dimensions of member 28, or more specifically of bore 30. Once lock nut 26 is in proper position and is permitted to warm to room, or ambient, temperatures, however, the memory metal from which body member 28 is formed will seek to recover (shrink) to the normal dimensions thereof so as to cause body member 28 to grippingly engage stud 12 in a locking or nut retaining manner.

Although the diameter of the bore 30 of nut 26 is smaller than the diameter of an associated stud 12, the precise dimensional difference varies as a function of the basic size of stud in question, and of the particular memory metal used to construct nut 26. As a general rule, however, the maximum pressure, or load, exerted on the lock nut 26 must not be more than one-half of the yield strength of the memory metal employed. For example, if the memory metal has a yield strength of 60,000 psi, the diameter of the lock nut 26 must be selected for a load exerted on the body means to be less than 30,000 psi. Otherwise, the metal may be "overworked" and permanently deformed.

As can be appreciated, it is feasible, assuming strength considerations permit, to use a lock nut 26 merely to retain an element 10 in proper position. As a practical matter, however, the strength of the body member 28 could not be made sufficiently great to handle loads which will be encountered in most applications contemplated for the invention, and therefore it is preferable to use a load-carrying nut 16. Such a nut 16 includes a block 18, as mentioned above, which can be constructed in a conventional manner from a suitable steel, and the like, and which can have a six-sided or hexagonal, periphery, for example, as is conventional for load-carrying nuts. Each of the plurality of peripheral sides 36 of block 18 extends between a pair of surfaces 38 and 40 between which the hole is disposed. Although surface 38 can be substantially planar as is conventional, surface 40 advantageously is concave and is configured to matingly receive a convex portion of the body member 28 as described in greater detail below, in order to reduce the profile height of the combination of nut 16 and lock nut 26 in those situations where space is particularly critical.

Although body member 28 can assume any suitable configuration, preferably it is in the form of a solid body having a substantially circular or cylindrical periphery 42 and a pair of oppositely directed faces 44 and 46. While face 44 can be substantially planar, face 46 preferably is convex in shape as mentioned above in order to matingly engage within the concave surface 40 of block 18. In this particular example, body member 28 is a solid body in the shape of a frusto-conical disc, and the periphery 42 thereof is provided with at least one pair of opposed recesses 48 arranged for receiving a spanner wrench (not shown) as are conventional and commonly employed. Such an arrangement of recesses generally is referred to as forming a slotted spanner. Advantageously, a second pair of recesses 50 are disposed substantially perpendicularly to recesses 48 to form a second spanner arrangement.

Figure 5:
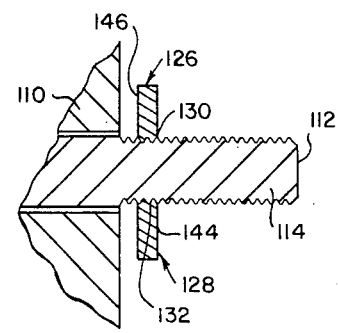
FIG. 5 is a fragmentary, sectional view, similar to FIGS. 2 and 3, but showing a second exemplification of a fastener apparatus according to the present invention.
Figure 4:
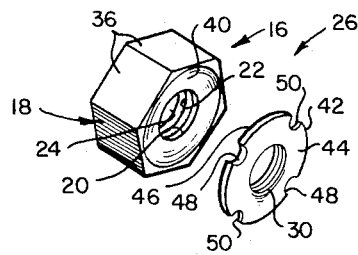
FIG. 4 is an exploded, perspective view, showing the fastener apparatus according to FIGS. 1-3.

Referring now more particularly to FIG. 5 of the drawings, an element 110 similar to element 10 is illustrated as being held in proper position by a stud 112 similar to stud 12 and provided with conventional screw threads 114. A lock nut 126 formed by a body member 128 constructed from a memory metal in the manner of body member 28 is provided with a through bore 130 in which are provided screw threads 132. As will be appreciated, lock nut 126 is essentially the same as lock nut 26, but is configured substantially disc-shaped as it is intended to be used alone and without an associated load-carrying nut such as nut 16. In this instance, both of the faces 144 and 146 can be substantially planar, so that face 146 presents a larger contact area relative to the associated element 110 being retained in position by lock nut 126. At the same time, nut 126 is restrained against movement due to vibrations, and the like, due to the gripping action of a recovered body member 128 against an associated stub 112.

As can be readily understood from the above description and from the drawings, a fastener arrangement according to the present invention permits an effective locking against vibrations, and the like, in a simple and efficient manner using a minimum of space. Whether a locking nut according to the invention is used alone or with a cooperating load-carrying nut, depends on stresses to which the fastener is to be subjected.

Although a number of forms and modifications have been described, it will be appreciated that the invention is not limited thereto but encompasses all variations within the scope of the appended claims.

What is claimed is:

1. In combination, a load-carrying nut including an internal wall defining a through hole in the load-carrying nut, the wall having internal screw threads formed on it, and a lock nut comprising a solid body in the shape of a frusto-conical disc constructed from a memory metal and having a periphery and a pair of oppositely directed faces, one of the faces having a convex shape, the periphery of the lock nut including at least one pair of opposed recesses for receiving a spanner wrench, the lock nut further including a bore having internal screw threads and a diameter that is undersized relative to the hole defined by the wall of the load-carrying nut, the load-carrying nut having a pair of opposed surfaces arranged extending from the hole thereof, one of the surfaces being concave and configured to matingly receive the convex face of the lock nut for reducing the total height dimension of the combination of load-carrying nut and lock nut, and wherein the memory metal possesses a thermoelastic transition between a martensitic state and an austenitic state, the metal being deformable dimensionally while in its martensitic state and capable of recovering to a non-deformed dimension in the austenitic state for reducing the diameter of the bore when the lock nut has recovered to the austenitic state to grippingly engage a stud on which the load-carrying nut and lock nut are threadable.

* * * * *